April 29, 1924.
N. G. WARTH
REGULABLE CUSHION TRUCK TIRE
Filed Nov. 24, 1922.
1,492,231
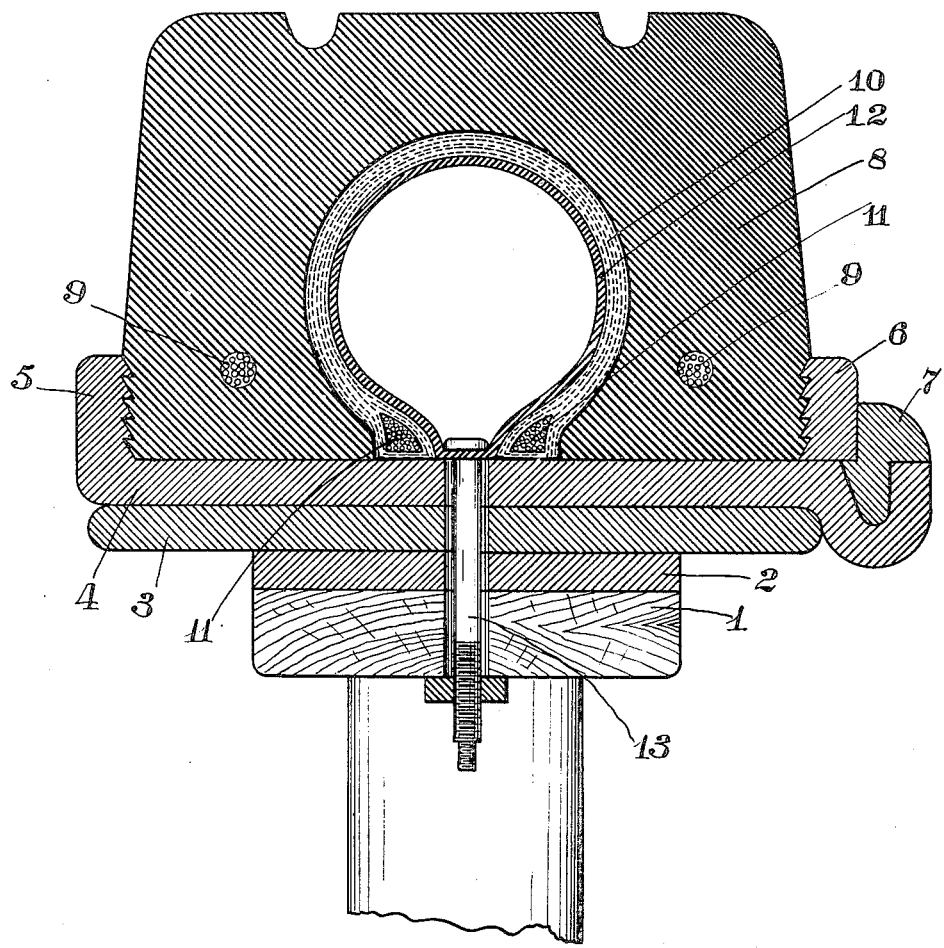
INVENTOR
NATHANIEL G. WARTH
his ATTYS.

Patented Apr. 29, 1924.

1,492,231

UNITED STATES PATENT OFFICE.

NATHANIEL G. WARTH, OF GALLIPOLIS, OHIO.

REGULABLE CUSHION TRUCK TIRE.

Application filed November 24, 1922. Serial No. 603,103.

*To all whom it may concern:*

Be it known that I, NATHANIEL G. WARTH, a citizen of the United States, residing at Gallipolis, in the county of Gallia and State of Ohio, have invented a certain new and useful Improvement in Regulable Cushion Truck Tires, of which the following is a specification.

The solid tire of the broad type that is commonly used for trucks is designed to carry heavy loads and has a limit of resiliency which is soon reached due to the loading or to the pounding and blows of road action. The effect is that the tire becomes relatively hard and unyielding as though there were no rubber tread. To overcome this condition manufacturers have developed the cushion tread or tire by forming cavities, recesses or perforations of various forms, number and sizes and at various points in the tire for the purpose of making portions of the tire or tread somewhat yielding after the manner of pneumatic tires; but such expedients weaken the tire, lessen their wearing quality and render their destruction more rapid.

To overcome these objections I propose to reinforce such a tire with a pneumatic core, the air cushion of which by its peculiar resilience and resistance shall cooperate with the natural resiliency and cushioning effect of the main rubber body, said pneumatic being regulable as to its resiliency and carrying capacity according to the load to be imposed by the degree of inflation of the core.

The invention is embodied in the example herein shown and described, the features of novelty being pointed out in the claims.

In the accompanying drawing the view is a cross section of the felloe of a wheel equipped with a demountable rim and tire according to my invention.

In the view the character 1 designates the felloe of the wheel upon which is secured around it a metallic tire 2. Fixed to the metallic tire is a wider rim 3 forming the seat for the demountable rim 4 which has a fixed flange 5 and removable flange 6 the latter being held in position by a removable locking ring 7, as usual, to secure the flange 6 in position. The flange 6 is made removable so that the tire can be slid onto the rim sidewise as well understood. Both the removable flange 6 and the permanent flange 5 are provided at their inner surface with rubber engaging projections to aid in holding the tire in position. The body of the cushion tire 8 is of solid rubber of the broad form designed and adapted for trucks for carrying heavy loads and its base is preferably provided at each side with anchorage cables or wires 9. The middle of the tire body at its inner side or base is molded with a circumambient cavity of generally circular form in cross section to receive a flexible pneumatic carcass 10 fitting closely in the cavity and open at its inner side said carcass being provided with anchoring beads containing wires or cables 11. The character 12 designates an inner inflatable tube adapted to the carcass 10 said tube being provided as usual with a stem 13 and valve whereby the tube can be inflated to the desired degree.

Because of the shown construction of the solid rubber or cushion portion of tire it can be used for the lighter loads without inflation at all; but where the load is heavier than a specified or predetermined weight for a given tire of such construction the inner tube is proportionally inflated to withstand the pressure and shocks exerted by such excess of load in which event the pneumatic tire core acts as a reinforcing element to the tire as a whole.

It is not necessary to provide the carcass 10 with the usual breaker and its cushion, nor with the usual rubber tread hence it is economically employed. The heavy sides of the cushion tire reaching from the tread to the rim serve as ample supports for the lighter loads referred to.

The carcass being within the cavity of the cushion tire it is fixed as to its position and also by the resting of the beads upon the same rim with the cushion tire.

When the inner tube is inflated the pressure thereof aids in locking the bases of the cushion to the rim.

The forms of the parts can be varied without departing from the gist of the invention as claimed.

What I claim is:

1. A rubber cushion tire for a broad rimmed wheel, said tire having a broad tread substantially straight in cross section and a broad base also substantially straight in cross section and parallel to the tread, and also having a circumambient centrally disposed cavity at its inner side, and a restraining flexible carcass in said cavity adapted to receive an inflatable inner tube with means whereby the same may be inflated, the cushion walls of the tire at opposite sides of the cavity being adapted to support a load in vertical lines upon the rimmed wheel independently of the central inflatable portion.

2. A rubber cushion tire for a broad rimmed wheel, having tire engaging flanges, said tire having a broad tread substantially straight in cross section and a broad base also substantially straight in cross section and parallel to the tread, and also having at its inner side a circumambient centrally disposed cavity circular in cross section dividing the body of the tire into two load bearing portions with relatively broad bases, a restraining, flexible and removable carcass in said cavity provided with means for anchoring the same to the rim, said carcass adapted to receive an inflatable inner tube provided with means whereby the same may be inflated, the lateral load bearing portions of the tire at opposite sides of the cavity being adapted to support a load in vertical lines upon the wheel rim, and the carcass cooperating with the rim flanges to retain the tire body on the rim.

NATHANIEL G. WARTH.